(12) United States Patent
Smith

(10) Patent No.: US 10,338,929 B2
(45) Date of Patent: Jul. 2, 2019

(54) METHOD FOR HANDLING EXCEPTIONS IN EXCEPTION-DRIVEN SYSTEM

(71) Applicant: Imagination Technologies Limited, Kings Langley (GB)

(72) Inventor: Christopher Philip Smith, Chepstow (GB)

(73) Assignee: Imagination Technologies Limited, Kings Langley (GB)

( * ) Notice: Subject to any disclaimer, the term of this patent is extended or adjusted under 35 U.S.C. 154(b) by 71 days.

(21) Appl. No.: 15/498,149

(22) Filed: Apr. 26, 2017

(65) Prior Publication Data

US 2017/0315816 A1    Nov. 2, 2017

(30) Foreign Application Priority Data

Apr. 28, 2016    (GB) .................................. 1607441.1

(51) Int. Cl.
    *G06F 9/38*    (2018.01)
    *G06F 9/46*    (2006.01)
    *G06F 9/48*    (2006.01)

(52) U.S. Cl.
    CPC ............ *G06F 9/3865* (2013.01); *G06F 9/461* (2013.01); *G06F 9/4812* (2013.01)

(58) Field of Classification Search
    None
    See application file for complete search history.

(56) References Cited

U.S. PATENT DOCUMENTS

| 5,414,864 | A  | * | 5/1995 | Koizumi ................. | G06F 9/461 |
|---|---|---|---|---|---|
|           |    |   |        |                          | 711/E12.099 |
| 5,928,356 | A  | * | 7/1999 | Golliver .............. | G06F 9/30123 |
|           |    |   |        |                          | 711/100 |
| 6,205,467 | B1 | * | 3/2001 | Lambrecht ............ | G06F 9/3863 |
|           |    |   |        |                          | 712/E9.061 |
| 6,289,446 | B1 | * | 9/2001 | Nilsson ................. | G06F 9/4484 |
|           |    |   |        |                          | 712/244 |
| 7,243,222 | B2 | * | 7/2007 | Rothman ............ | G06F 11/3636 |
|           |    |   |        |                          | 713/1 |

(Continued)

FOREIGN PATENT DOCUMENTS

GB        2506169 A      3/2014

*Primary Examiner* — Eric Coleman
(74) *Attorney, Agent, or Firm* — Vorys, Sater, Seymour and Pease LLP; Vincent M DeLuca

(57) ABSTRACT

A method of processing exceptions in an exception-driven computing-based system that operates in either initialization mode or exception-driven mode. The method includes, upon detecting an exception has occurred, causing the processor to execute exception handling instructions. When the system is operating in initialization mode the exception handling instructions invoke a first exception handler that causes a main register set to be saved before processing the exception and restored after processing the exception, and when the system is operating in exception-driven mode the exception handling instructions invoke a second exception handler that does not cause the main register set to be saved and restored. In some examples, the exception handling instructions are initially configured to invoke the first exception handler and are dynamically updated when the system switches from initialization mode to exception-driven mode to invoke the second exception handler.

20 Claims, 7 Drawing Sheets

(56) References Cited

U.S. PATENT DOCUMENTS

| | | | | |
|---|---|---|---|---|
| 7,603,551 | B2* | 10/2009 | McGrath | G06F 9/4403 713/164 |
| 8,171,268 | B2* | 5/2012 | Newburn | G06F 9/461 712/228 |
| 9,383,935 | B1* | 7/2016 | Warkentin | G06F 3/0632 |
| 2003/0074545 | A1* | 4/2003 | Uhler | G06F 9/30123 712/228 |
| 2004/0163067 | A1* | 8/2004 | Migliore | G06F 17/5072 716/103 |
| 2009/0037710 | A1* | 2/2009 | Mavinakayanahalli | G06F 11/3644 712/244 |
| 2011/0225402 | A1* | 9/2011 | Grisenthwaite | G06F 9/30101 712/244 |
| 2015/0067220 | A1* | 3/2015 | Schwach | G06F 13/24 710/269 |

* cited by examiner

METHOD FOR HANDLING EXCEPTIONS IN EXCEPTION-DRIVEN SYSTEM

BACKGROUND

When a program is being executed by a processor, the instructions of the program read from, and write to, a set of shared registers (e.g. a main register set). When an exception (i.e. an anomalous or exceptional condition requiring special processing) occurs the normal flow of program execution is interrupted and the program typically jumps to exception handling instructions which implement an exception handler. For example, as shown in FIG. 1, if an exception 102 occurs when instruction A 104 of a main program 106 is being executed, the processor may jump from the main program 106 to an exception handler 108.

The exception handler 108 may cause the processor to write to and read from the main register set 109 as it processes the exception. However, since the main program 106 is written as if there are no exceptions (i.e. if instruction A 104 writes 5 to register X then if instruction B 112 subsequently reads from register X then instruction B 112 expects to read the value 5) it is important that before an exception is processed (e.g. by the exception handler 108) the state of the main register set 109 is preserved so that when the main program 106 is resumed the state of the main register set 109 can be restored so that the main program 106 can continue as if the exception had not occurred.

Accordingly, the exception handler 108 typically causes the processor to save the state of the main register set 109 before processing the exception to allow any changes made to the main register set 109 while processing the exception to be undone. The exception handler 108 then causes the processor to process the exception (e.g. the exception handler 108 may invoke a subroutine 110 for handling the specific type of exception) using the main register set 109 (e.g. writing to and reading from the main register set 109). Once the exception has been processed the exception handler 108 causes the processor to restore the main register set 109 and (where appropriate) return to executing instructions of the main program 106 (e.g. return to instruction B 112). However, saving and restoring the main register set 109 before and after processing an exception takes a significant amount of time.

To reduce the exception response time, the concept of banked or shadow registers were developed. Banked or shadow registers are a separate set of registers that are used for processing exceptions, or for processing certain types of exceptions. Since a separate register set is used to process exceptions (or certain types of exceptions) there is no need to save and restore the main register set before processing an exception (or the specific type of exception).

For example, as shown in FIG. 2, the processor may be configured to execute instructions of a main program 202 using a first or main register set 204 (e.g. writing to and reading from the main register set 204). When an exception 206 occurs during processing of instruction A 208 of the main program 202, an exception handler 210 may be invoked. Instead of causing the processor to save and restore the main register set 204, the processor is configured to execute the exception handler 210 (e.g. which may invoke a subroutine 212 for handling the specific type of exception) using a second or shadow register set 214 (e.g. writing to and reading from the shadow register set 214). Once the exception has been processed the processor returns to the main program 202 (e.g. to instruction B 216) where it goes back to using the main register set 204 (e.g. writing to and reading from the main register set 204). While this significantly reduces the overhead and reduces the effective latency associated with exceptions, the shadow register set 214 requires extra hardware to implement.

This problem is exacerbated when there are multiple nested exceptions because there is typically one shadow register set for each level of nested exception. Nested exceptions occur when certain exceptions (e.g. high priority exceptions) may interrupt processing of other exceptions (e.g. low priority exceptions).

The embodiments described below are provided by way of example only and are not limiting of implementations which solve any or all of the disadvantages of known methods of handling exceptions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described herein are methods of processing exceptions in an exception-driven computing-based system that operates in either initialisation mode or exception-driven mode. The method includes, upon detecting an exception has occurred, causing the processor to execute exception handling instructions using a main register set. When the system is operating in initialisation mode the exception handling instructions invoke a first exception handler that causes a main register set to be saved and restored, and when the system is operating in exception-driven mode the exception handling instructions invoke a second exception handler that does not cause the main register set to be saved and restored. In some examples, the exception handling instructions are dynamically updated when the system switches from initialisation mode to exception-driven mode to invoke the second exception handler.

A first aspect provides a method of processing exceptions in an exception-driven computing-based system, the method comprising: executing, using a processor of the system, a main program which causes the system to operate first in an initialisation mode and then in an exception-driven mode; detecting, using the processor, that an exception has occurred; in response to detecting that an exception has occurred, executing, using the processor, exception handling instructions using a main register set; and wherein when the system is operating in the initialisation mode the exception handling instructions invoke a first exception handler that causes the processor to save the main register set prior to processing the exception and restore the main register set after processing the exception, and when the system is operating in the exception-driven mode the exception handling instructions invoke a second exception handler that does not cause the processor to save and restore the main register set.

A second aspect provides an exception-driven computing-based system comprising: memory configured to store: a main program; and exception handling instructions; and a processor configured to: execute the main program which causes the system to operate first in an initialization mode and then in an exception-driven mode; detect that an exception has occurred; and in response to detecting that an exception has occurred execute the exception handing instructions using a main register set of the processor; and wherein when the system is operating in the initialisation mode the exception handling instructions invoke a first exception handler that causes the processor to save the main register set prior to processing the detected exception and restore the main register set after processing the detected exception, and when the system is operating in the exception-driven mode the exception handling instructions invoke a second exception handler that does not cause the processor to save and restore the main register set.

The exception-driven computing-based system may be embodied in hardware on an integrated circuit. There may be provided a method of manufacturing, at an integrated circuit manufacturing system, an exception-driven computing based system. There may be provided an integrated circuit definition dataset that, when processed in an integrated circuit manufacturing system, configures the system to manufacture an exception-driven computing-based system. There may be provided a non-transitory computer readable storage medium having stored thereon a computer readable description of an integrated circuit that, when processed, causes a layout processing system to generate a circuit layout description used in an integrated circuit manufacturing system to manufacture an exception-driven computing-based system.

There may be provided an integrated circuit manufacturing system comprising: a non-transitory computer readable storage medium having stored thereon a computer readable integrated circuit description that describes the exception-driven computing-based system; a layout processing system configured to process the integrated circuit description so as to generate a circuit layout description of an integrated circuit embodying the exception-driven computing-based system; and an integrated circuit generation system configured to manufacture the exception-driven computing-based system according to the circuit layout description.

There may be provided computer program code for performing a method as described herein. There may be provided non-transitory computer readable storage medium having stored thereon computer readable instructions that, when executed at a computer system, cause the computer system to perform the method as described herein.

The above features may be combined as appropriate, as would be apparent to a skilled person, and may be combined with any of the aspects of the examples described herein.

BRIEF DESCRIPTION OF THE DRAWINGS

Examples will now be described, in detail with reference to the accompanying drawings in which.

Figure 1:
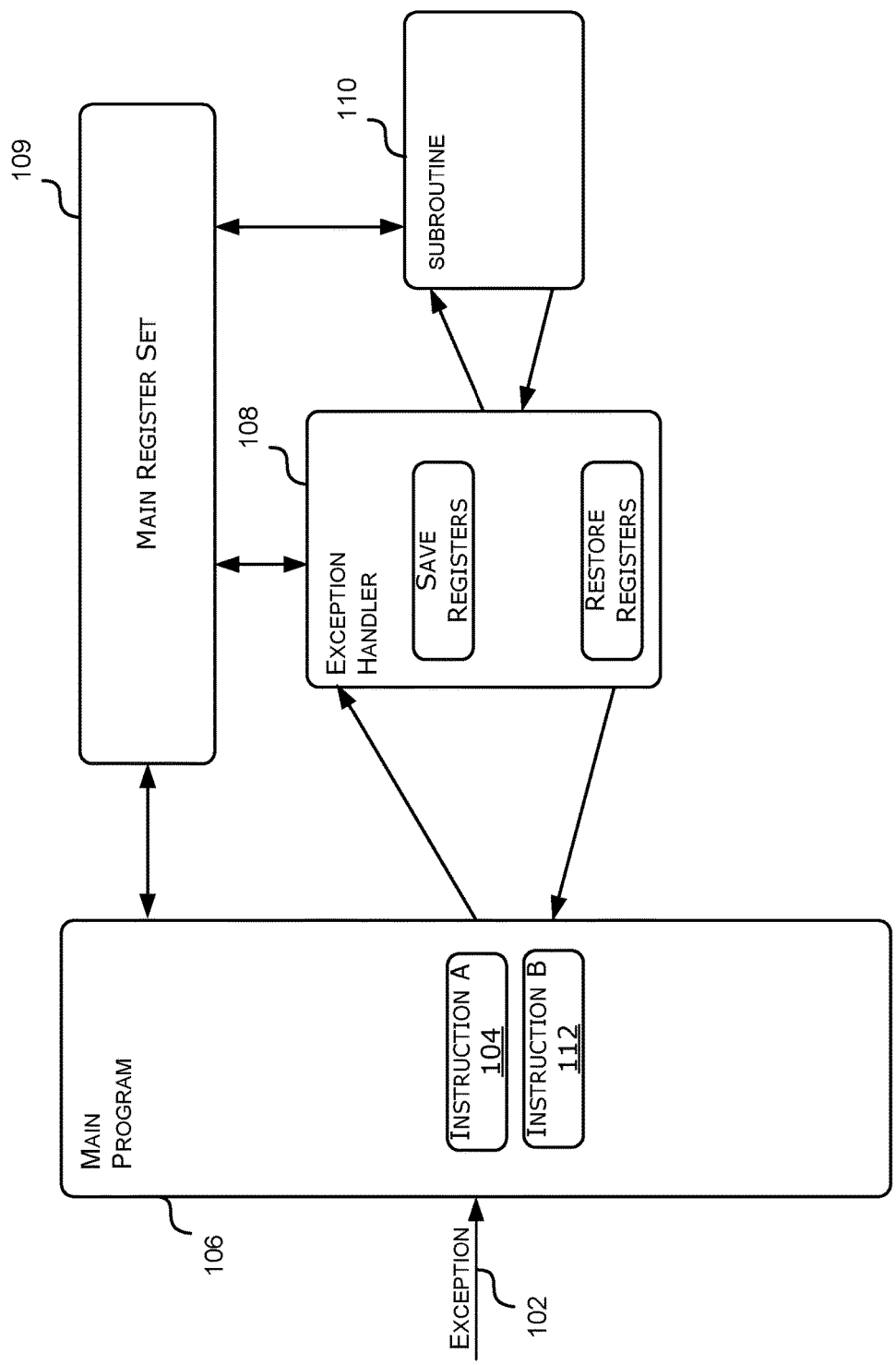
FIG. 1 is a schematic diagram illustrating a first example method for handling exceptions that includes storing and restoring the main register set.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The term "exception" is used herein to mean an anomalous or exceptional condition which interrupts the normal flow of program execution by a processor. Exceptions may be generated by sources external or internal to the processor. Exceptions include, but are not limited to externally generated interrupts; and internally generated faults, traps and aborts.

As described above, to ensure that after an exception a program can continue as if the exception had not occurred, a computing-based system typically implements a mechanism for preserving the state of the main register set during processing of an exception. For example, as described above, the computing-based system may be configured to save the main register set before processing the exception and restore the main register set after processing the exception; or the computing-based system may be configured to maintain a separate register set (e.g. a shadow register set) for use in processing exceptions. However, storing and restoring a register set is time consuming; and maintaining a separate register requires extra hardware to implement.

There are some computing-based systems, such as embedded systems (e.g. a radio processing unit (RPU) software stack), which, once initialisation is complete are entirely driven by exceptions (e.g. interrupts). Such computing-based systems will be referred to herein as exception-driven computing-based systems. Exception-driven computing-based systems typically implement one of the mechanisms described above for preserving the state of the main register set during processing of an exception (e.g. save and restore; or shadow register set). However, once initialisation of an exception-driven computing-based system has been completed the system simply waits for the next exception and thus no longer reads from, or writes to, the main register set as part of the main program. Therefore, once the initialisation is complete it is no longer important to preserve the state of the main register set while processing exceptions. As a result, exceptions can be processed using the main register set directly (i.e. without having to save and restore them) which allows exceptions to be processed much more efficiently.

Accordingly, described herein are methods for processing exceptions in an exception-driven computing-based system using a main register set that include invoking a different exception handler after the system has been initialised. The method comprises operating the computing-based system in an initialisation mode during initialisation where exceptions are processed by a first exception handler that causes the main register set to be saved before processing the exception and restored after processing the exception; and, after the initialisation is complete, switching to an exception-driven mode where the main program surrenders the main register set and exceptions are processed by a second exception handler that does not cause the main register set to be saved before processing the exception and restored after processing the exception.

Figure 3:
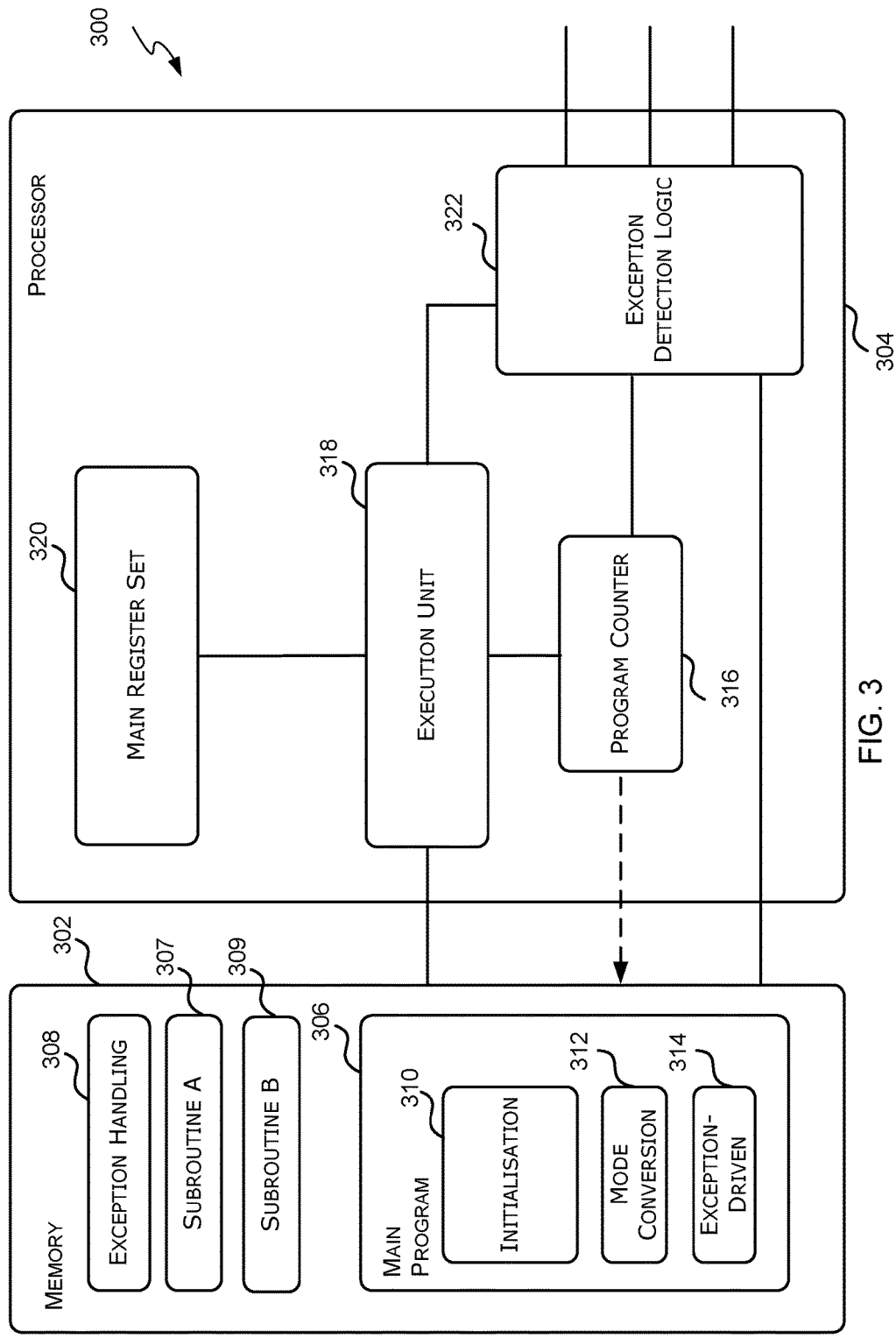
FIG. 3 is a block diagram of a first example exception-driven computing-based system.

Reference is now made to FIG. 3 which illustrates an example exception-driven computing-based system 300 which is configured to process exceptions differently based on whether the system 300 is operating in an initialisation mode or an exception-driven mode. The system 300 comprises memory 302 for storing instructions; and a processor 304 for executing the instructions stored in the memory 302.

The memory 302 is configured to store computer executable instructions to be executed by the processor 304. The memory 302 may be implemented using any suitable type of storage media, such as volatile and non-volatile media implemented in any method or technology for storage of computer readable instructions. Computer storage media includes, but is not limited to, RAM, ROM, EPROM, EEPROM, flash memory or other memory technology. In contrast, communication media may embody computer readable instructions, data structures, program modules, or other data in a modulated data signal, such as a carrier wave, or other transport mechanism.

The memory 302 is configured to store, at least, instructions for a main program 306 and one or more sets of exception handling instructions 308 (which invoke an exception handler) for processing exceptions.

In some cases, as shown in FIG. 3, one set of exception handing instructions 308 is stored in memory 302 that is initially configured to cause the processor 304 to execute a first exception handler. The first exception handler causes the processor to save the main register set 320 before processing the exception and restore the main register set after processing the exception; but, as will be described in more detail below, the exception handling instructions 308 may be reconfigured once the system switches to exception-driven mode to cause the processor 304 to execute a second exception handler that does not cause the processor 304 to save and restore the main register set 320.

In other cases, multiple sets of exception handling instructions 308 are stored in memory 302. In these cases there is at least one set of exception handling instructions 308 that is configured to cause the processor 304 to execute a first exception handler that causes the processor to save the main register set before processing the exception, and restore the main register set after processing the exception; and at least one set of exception handling instructions that is configured to cause the processor 304 to execute a second exception handler that does not cause the processor to save and restore the main register set 320.

Figure 2:
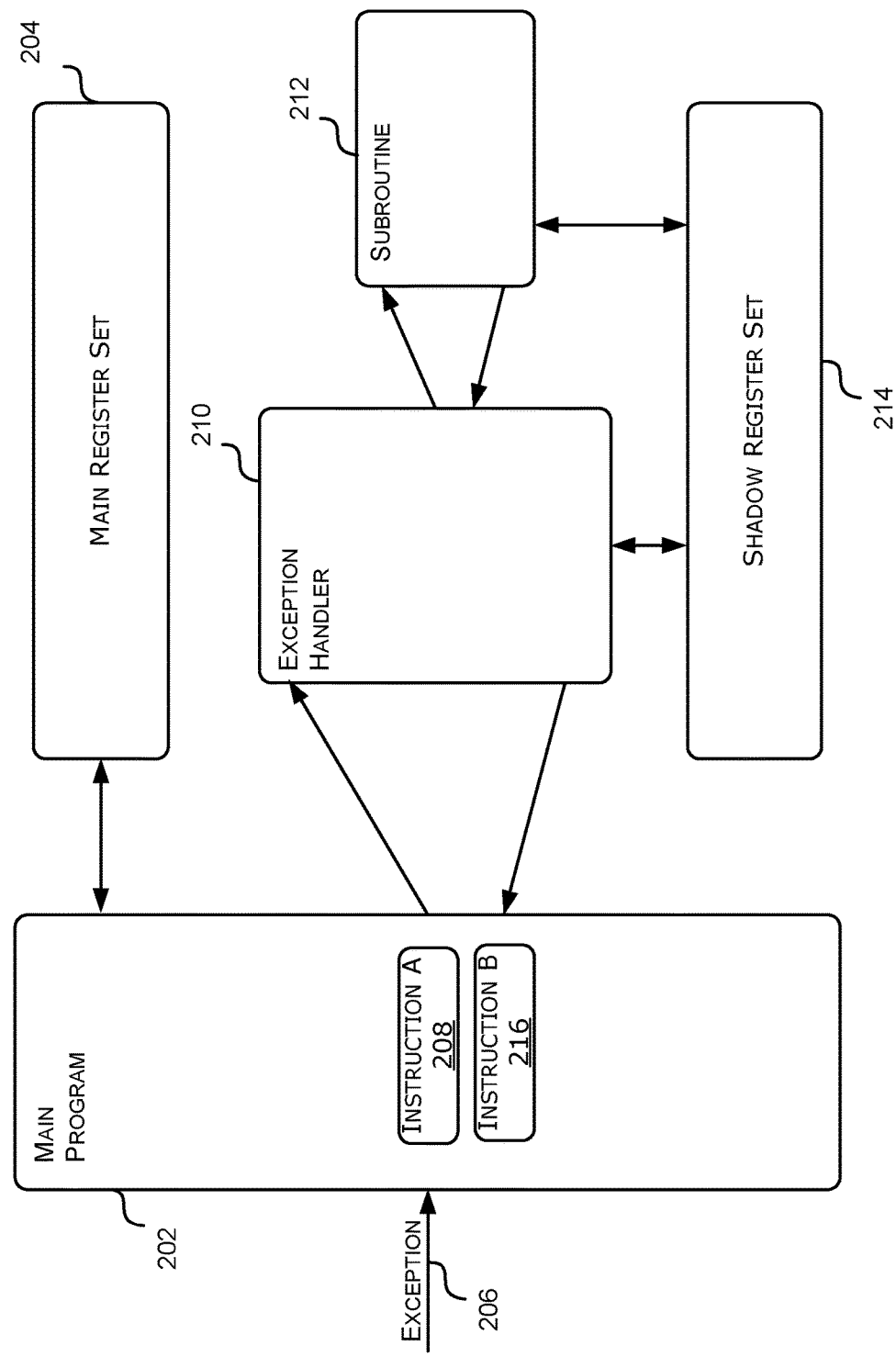
FIG. 2 is a schematic diagram illustrating a second example method for handling exceptions that includes using a shadow register set.

The memory 302 may also be configured to store one or more sets of subroutine instructions 307 and 309 for processing certain types of exceptions as described above with respect to FIGS. 1 and 2. The sets of subroutine instructions 307 and 309 may be invoked by the exception handling instructions 308.

The instructions forming the main program 306 (which may also be referred to as the non-exception instructions) may be divided into initialisation instructions 310; mode conversion instructions 312; and exception-driven instructions 314.

The initialisation instructions 310 cause the processor 304 to configure or initialise the system 300 for operation and typically cause the processor 304 to write to, and read from, the main register set 320. When the processor 304 is executing the initialisation instructions 310 the system 300 is said to be operating in initialisation mode. Accordingly, when the system 300 is operating in initialisation mode it is important to preserve the state of the main register set 320 during exception processing.

In contrast, the exception-driven instructions 314 cause the processor 304 to wait for exceptions and do not cause the processor 304 to read from, or write to, the main register set 320. When the processor 304 is executing the exception-driven instructions 314 the system 300 is said to be operating in exception-driven mode. Accordingly, when the system 300 is operating in exception-driven mode the state of the main register set 320 does not need to be preserved during exception processing.

The mode conversion instructions 312 cause the processor 304 to convert or switch from initialisation mode to exception-driven mode. Specifically, the mode conversion instructions 312 indicate to the processor 304 that the main program is surrendering the main register set 320 and no longer requires use of them and thus exceptions can be handled by an exception handler that does not save and restore the main register set.

In some examples, the mode conversion instructions 312 are configured to cause the processor 304 to modify the exception handling instructions 308 stored in memory 302. For example, in some cases the mode conversion instructions 312 may be configured to cause the processor 304 to replace the exception handling instructions 308 stored in memory 302 with a different set of exception handling instructions that invoke an exception handler that does not cause the processor 304 to save and restore the main register set 320. In other cases, the mode conversion instructions 312 may be configured to cause the processor 304 to update the exception handling instructions 308 stored in memory 302 to point to another section or address of the memory 302 which comprises exception handling instructions that invoke an exception handler that does not cause the processor 304 to save and restore the main register set 320.

In other examples, the mode conversion instructions 312 are configured to cause the processor 304 to modify the exception detection logic 322 (described in more detail below) to cause the exception detection logic 322 to invoke a different exception handler when an exception is detected. For example, in some cases, the mode conversion instructions 312 may be configured to cause the processor 304 to notify the exception detection logic 322 that the system 300 is now operating in exception-driven mode. Upon receipt of the notification the exception detection logic 322 may reconfigure itself to set the program counter 316 (described in more detail below) to a different address of the memory 302 when an exception is detected to cause a different exception handler to be invoked. In other cases, the address of the exception handling instructions invoked by the exception detection logic 322 is an offset from a configurable base address. In these cases the mode conversion instructions 312 may be configured to cause the processor 304 to modify the base address which causes a different exception handler to be invoked.

An example method that may be implemented by the processor 304 when the processor 304 executes the mode conversion instructions 312 will be described below with reference to FIG. 5.

The processor 304 is configured to execute the instructions stored in memory 302. The processor 304 maybe a microprocessor, controller or any other suitable type of processor for processing computer executable instructions to control the operation of the exception-driven computing-based system 300.

The example processor 304 of FIG. 3 comprises a program counter 316 that points to an instruction stored in the memory 302; an execution unit 318 for executing the instructions in the order indicated by the program counter 316; a main register set 320 which is written to and read from by the execution unit 318; and exception detection logic 322 which detects exceptions and causes the processor 304 to execute exception handling instructions 308 to process the exception (which may call one or more subroutines 307 or 309 to process specific types of exceptions).

During normal operation, the program counter 316 is configured to point to the instructions in the main program 306 in program order—i.e. in the order dictated by operation of the program. The execution unit 318 fetches, decodes, and executes the instruction pointed to by the program counter 316. During execution of an instruction the execution unit 318 may read from, or write to, one or more registers in the main register set 320.

When, however, the exception detection logic 322 detects an exception, the normal flow of the program is interrupted. In particular, upon detecting an exception the exception detection logic 322 updates the program counter 316 to point to exception handling instructions 308 to cause the execution unit 318 to execute an exception handler to process the exception (which may call one or more subroutines 307 or 309 to process specific types of exceptions). This causes the execution unit 318 to stop executing instructions of the main program 306 and to start executing exception handling instructions 308.

When the system 300 is operating in the initialisation mode the exception handler invoked by the exception detection logic 322 is configured to cause the execution unit 318 to save the main register set 320 prior to processing the exception, and restore the main register set 320 using the saved data after processing the exception. However, when the system 300 is operating in the exception-driven mode the exception handler invoked by the exception detection logic 322 does not cause the execution unit 318 to save and restore the main register set 320.

In some examples, as described above, there is a single set of exception handling instructions 308 saved in memory 302 and the mode conversion instructions 312 are configured to, once the initialisation of the system 300 is complete, cause the execution unit 318 to overwrite the exception handling instructions 308 stored in memory 302 with exception handling instructions that invoke an exception handler that does not cause the execution unit 318 to save and restore the main register set 320.

In other examples, several sets of exception handling instructions invoking different exception handlers are stored in memory 302 and the main exception handling instructions point to one of the exception handlers. For example, the main exception handling instructions may be initially configured to point to (or jump to) exception handling instructions that invoke an exception handler that saves and restores the main register set 320. The mode conversion instructions 312 may then cause the processor 304 to update the main exception handling instructions 308 to point to (or jump to) exception handling instructions that invoke an exception handler that does not cause the execution unit 318 to save and restore the main register set 320.

In both these examples, the exception detection logic 322 may operate the same way regardless of the mode of operation of the system 300. For example, the exception detection logic 322 may (regardless of the mode of operation of the system 300) be configured to adjust the program counter 316 to point to a predetermined address for exception handling instructions upon detecting an exception. However, the instructions at the specified address will be different depending on the mode of operation of the system 300, which causes the processor 304 to invoke a different exception handler depending on the mode of operation of the system 300.

In other examples, at least two sets of exception handling instructions 308 invoking different exception handlers (e.g. a first exception handler that causes the execution unit 318 to save and restore the main register set 320, and a second exception handler that does not cause the execution unit 318 to save and restore the main register set 320) are stored at different addresses in the memory 302. In these examples the exception detection logic 322 may be configured to adjust the program counter 316 to point to an address of one of the sets of exception handling instructions based on the mode in which the system 300 is currently operating.

For example, as described above, in some cases, the mode conversion instructions 312 may be configured to cause the processor 304 to notify the exception detection logic 322 that the system 300 is now operating in exception-driven mode. Upon receipt of the notification, the exception detection logic 322 may reconfigure itself to, upon detecting an exception, set the program counter 316 to the address in memory which comprises the exception handling instructions that do not cause the execution unit 318 to save and restore the main register set 320. In other cases, the address of the exception handling instructions invoked by the exception detection logic 322 is an offset from a configurable base address, and the mode conversion instructions 312 are configured to cause the processor 304 (e.g. execution unit 318) to modify the base address so that when the system 300 is operating in exception-driven mode a different exception handler is invoked.

It will be appreciated that other processors may not comprise all the functional elements shown in FIG. 3 (i.e. one or more of the functional elements shown in FIG. 3 may be omitted) and may, in some examples, comprise additional functional elements not shown in FIG. 3. For example, other processors may comprise more than one execution unit each with its own main register set.

It will be evident to a person of skill in the art that the computing-based system 300 may also comprise other components not shown in FIG. 3. For example the computing-based system 300 may also comprises an input/output controller arranged to output display information to a display device which may be separate from or integral to the computing-based system 300. The display information may provide a graphical user interface. The input/output controller may also be arranged to receive and process input from one or more devices, such as a user input device (e.g. a mouse or a keyboard). In some examples, the display device may also act as the user input device if it is a touch sensitive display device. The input/output controller may also output data to devices other than the display device, e.g. a locally connected printing device.

Figure 4:
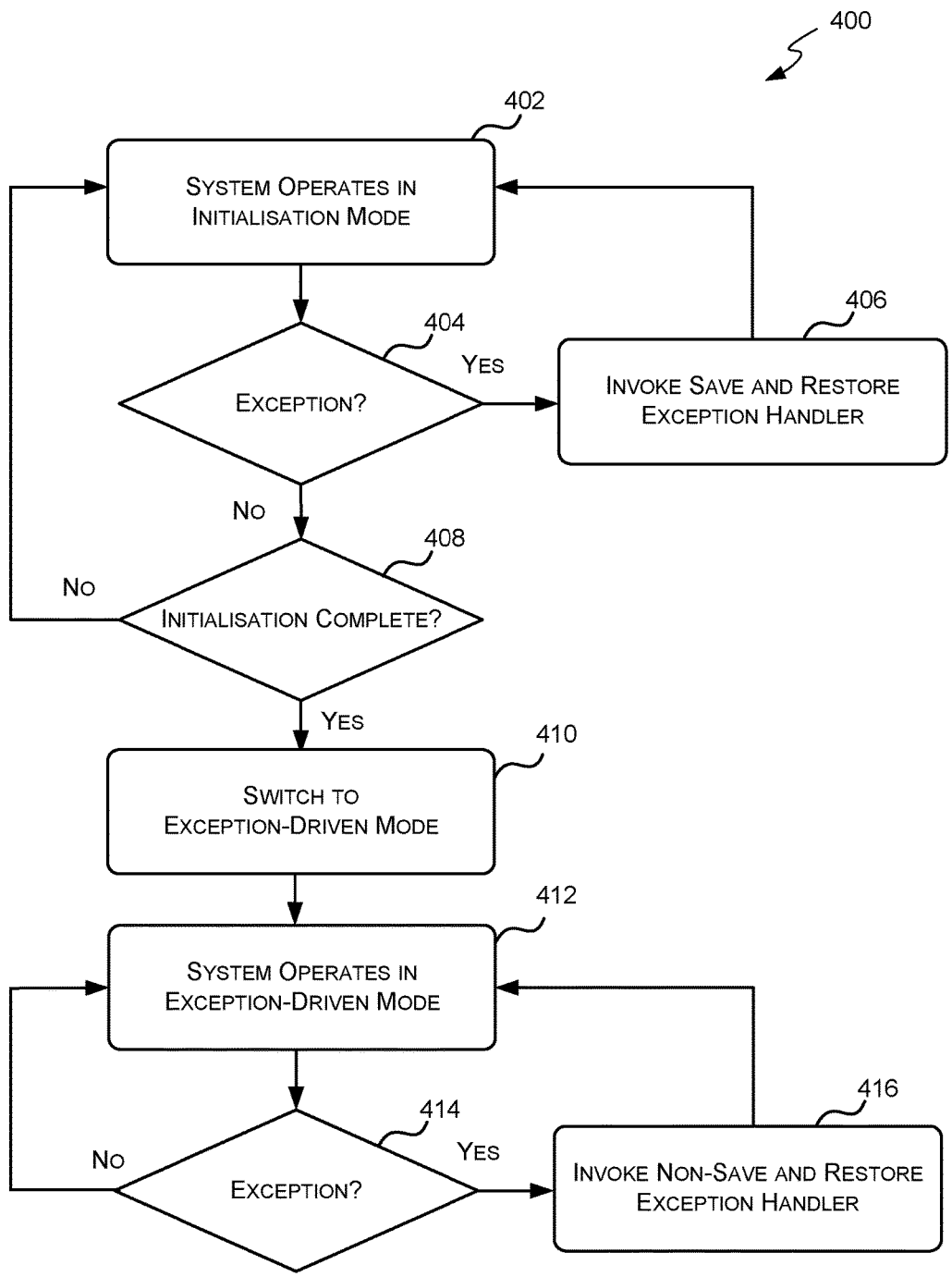
FIG. 4 is a flow diagram of an example method for handling exceptions in an exception-driven computing-based system.

Reference is now made to FIG. 4 which illustrates an example method 400 for processing exceptions in an exception-driven computing-based system, such as the exception driven computing-based system 300 of FIG. 3, using a main register set. The method 400 begins at block 402 where the system 300 operates in initialisation mode to initialise or setup the system 300 for operation. As described above, with reference to FIG. 3, operating in initialisation mode may comprise the processor 304 (e.g. the execution unit 318) executing initialisation instructions 310 of a main program 306 using a main register set 320 (e.g. writing to and reading from the main register set 320).

While the system 300 is operating in initialisation mode the processor 304 (e.g. the exception detection logic 322) monitors for exceptions (block 404). If an exception is detected (e.g. by the exception detection logic 322) then the method 400 proceeds to block 406 where an exception handler is invoked that causes the processor 304 (e.g. the execution unit 318) to save the main register set prior to processing the exception and restore the main register set after processing the exception. The processor 304 is configured to execute the exception handler using the main register set (e.g. the processor 304 writes to and reads from the main register set).

As described above with reference to FIG. 3, the exception handler that saves and restores the main register set may be invoked by, for example, the exception detection logic 322 updating the program counter 316 to point to an address of the memory 302 that comprises exception handling instructions. The address of the exception handling instructions may be hard-coded in the exception detection logic 322 or may be reconfigurable.

When the system 300 is operating in initialisation mode exceptions continue to be processed by an exception handler that causes the processor 304 (e.g. execution unit 318) to save and restore the main register set 320. It is important that the state of the main register set is preserved when processing exceptions during initialisation as the initialisation instructions typically cause the processor 304 to write to, and read from, the main register set 320. However, once the initialisation is complete (block 408) the method 400 proceeds to block 410.

At block 410, the system 300 performs a mode conversion to switch from initialisation mode to exception-driven mode. The conversion surrenders the main register set which allows exceptions to be directly processed using the main register set 320 (i.e. without performing a save of the main register set 320 first and restore of the main register set 320 after).

As described above, converting from initialisation mode to exception-driven mode may comprise the processor 304 (e.g. the execution unit 318) executing mode conversion instructions 312. In some examples, the mode conversion instructions 312 may be configured to cause the execution unit 318 of the processor 304 to overwrite the exception handling instructions 308 in memory 302 so that the exception handling instructions 308 no longer invoke an exception handler that causes the main register set to be saved and restored. In these examples the exception handler is thus dynamically updated during the mode conversion.

In other examples, the mode conversion instructions 312 may be configured to cause the execution unit 318 of the processor 304 to update the exception handling instructions 308 stored in memory 302 to jump to another set of exception handling instructions stored in memory 302 which invoke an exception handler that does not cause the execution unit 318 to save and restore the main register set (i.e. that processes the exception without saving the main register set first). Such an update dynamically changes the exception handler that is invoked for an exception. An example method for performing mode conversion from initialisation mode to exception-driven mode will be described below with reference to FIG. 5.

Once the system 300 has switched to exception-driven mode the method 400 proceeds to block 412 where the system 300 operates in exception-driven mode where it is exception-driven (i.e. it waits for exceptions to occur and then processes those exceptions). As described above, with reference to FIG. 3, operating in exception-driven mode may comprise the processor 304 (e.g. the execution unit 318) executing exception-driven instructions 314 of a main program 306 which causes the execution unit 318 to refrain from accessing (reading from or writing to) the main register set 320 and simply wait for exceptions (e.g. interrupts) to occur.

When the system 300 is operating in exception-driven mode the system 300 (e.g. the exception detection logic 322) monitors for exceptions (block 414). If an exception is detected (e.g. by the exception detection logic 322) then the method 400 proceeds to block 416 where an exception handler is invoked that processes the exception using the main register set, without causing the execution unit 318 to save the main register set 320 prior to processing the exception and restore the main register set 320 after processing the exception.

As described above, with reference to FIG. 3, an exception handler that does not cause the execution unit 318 to save and restore the main register set may be invoked by, for example, the exception detection logic 322 updating the program counter 316 to point to an address of the memory 302 that comprises exception handling instructions. The address of the exception handling instructions may be hard-coded in the exception detection logic 322 or may be dynamically selected or adjusted.

Figure 5:
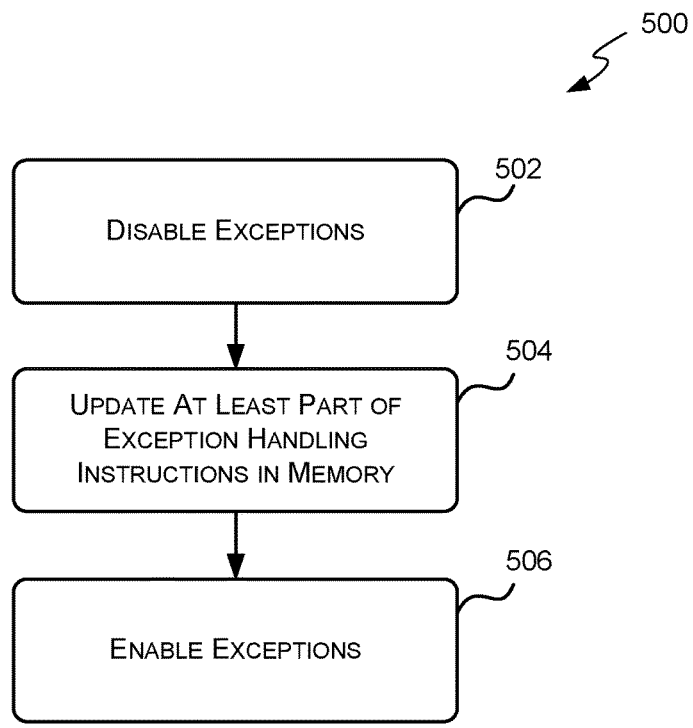
FIG. 5 is a flow diagram of an example method for switching between initialisation mode and exception-driven mode.

Reference is now made to FIG. 5 which illustrates an example method 500 for implementing block 410 of the method 400 of FIG. 4. In particular FIG. 5 illustrates an example method 500 for performing mode conversion which may be implemented by the execution unit 318 when it executes the mode conversion instructions 312 stored in memory 302. As described above, during mode conversion the main program 306 surrenders the main register set 320 and dynamically switches the exception handler invoked upon detection of an exception to an exception handler that does not cause the execution unit 318 to save and restore the main register set 320.

The method 500 begins at block 502 where exceptions are temporarily disabled. Since, during mode conversion, at least part of the exception handling instructions are updated, exceptions are disabled to avoid an error occurring if the exception detection logic 322 attempts to invoke the exception handling instructions when they are being updated.

Any suitable manner for disabling exceptions may be used. For example, in some cases disabling exceptions may comprise switching the processor 304 to operate in a no-exception mode where it will not jump to exception handling code under any circumstances. Some exceptions (e.g. interrupts) that occur while the processor is operating in such a no-exception mode may be held pending until exceptions are re-enabled whereas other exceptions (e.g. bad memory access) are not. The mechanism for putting the processor 304 in such a no-exception mode will vary from processor to processor. For example, in some cases the processor 304 may be put into a no-exception mode by setting or clearing bits in a status or control register. In these cases, processing an exception may automatically set the required bits of the status register so another exception cannot be processed until processing of the original exception is complete and the bits are cleared.

Once the exceptions have been disabled the method 500 proceeds to block 504.

At block 504, at least part of the exception handling instructions in memory are updated to cause a different exception handler to be invoked when an exception occurs. As described above, in some examples, the exception handling instructions in memory are replaced with a different set of exception handling instructions that cause the processor 304 to process the exception using the main register set 320 without performing saves and restores of the main register set 320. In other examples, the exception handling instructions in memory may be updated to cause the processor 304 to jump to a subroutine that comprises exception handling instructions that do not cause the processor 304 to perform saves and restores of the main register set.

Once the exception handling instructions in memory have been updated the method 500 proceeds to block 506 where the exceptions are enabled so that processing of exceptions can continue.

Any suitable manner for enabling exceptions may be used. For example, where exceptions are disabled by switching the processor 304 to a no-exception mode, exceptions may be enabled by switching the processor 304 out of the no-exception mode. In some cases the processor 304 may be switched out of the no-exception mode by setting or clearing bits in a status or control register.

While the examples described thus far relate to exception-driven computing-based systems which treat all exceptions in the same manner, the methods and principles described above can be applied to exception-driven computing-based systems where some exceptions are given higher priority than other exceptions.

Figure 6:
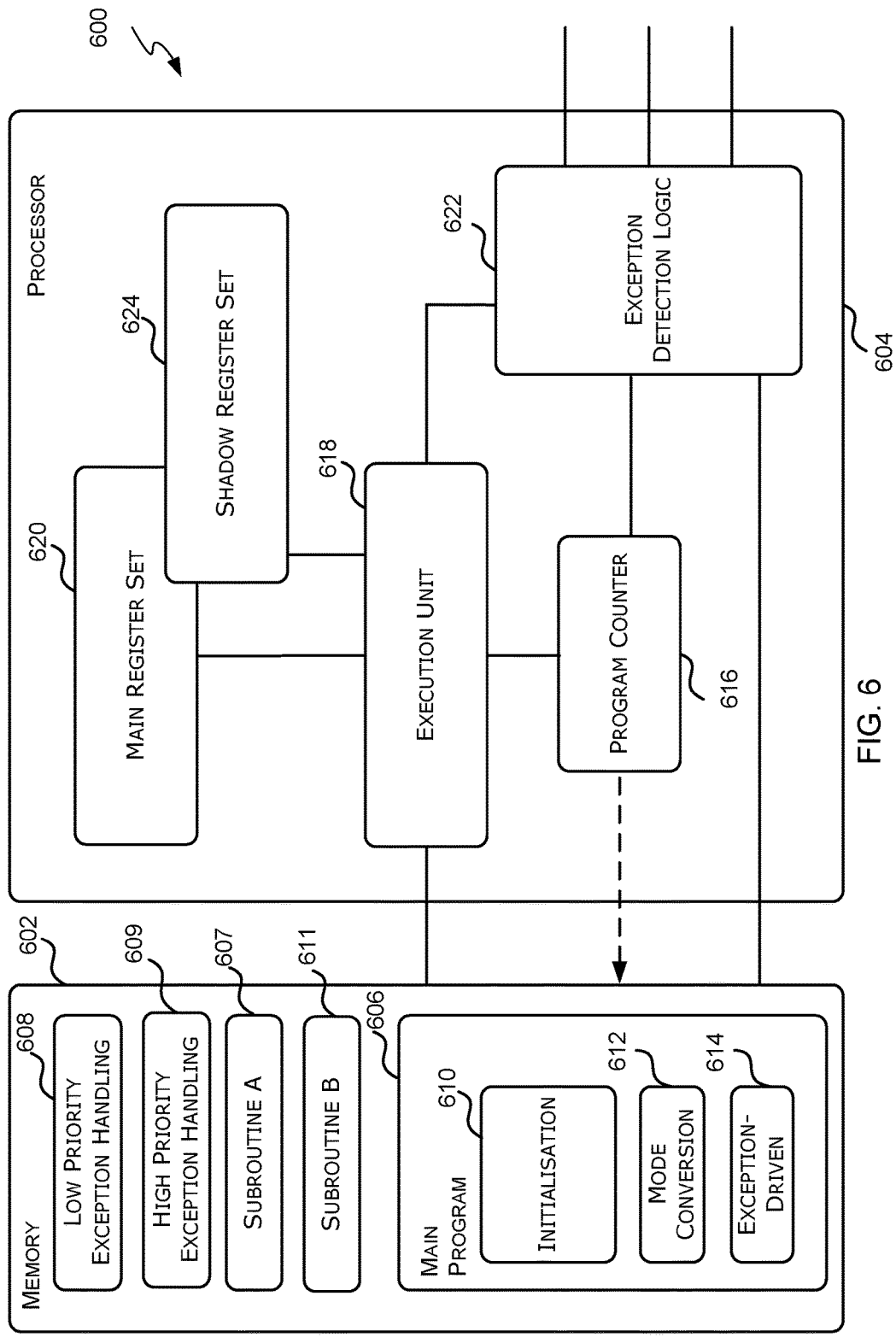
FIG. 6 is a block diagram of a second example exception-driven computing-based system.

Reference is now made to FIG. 6 which illustrates another example exception-driven computing-based system 600 in which exceptions are divided into high priority exceptions and low priority exceptions; and the high priority exceptions can interrupt or disrupt processing of the low priority exceptions. When one level or priority of exceptions can interrupt or disrupt processing of another level or priority of exception the exceptions are said to be nested. When a higher priority exception occurs when processing a lower priority exception the processing of the lower priority exception is paused and the higher priority exception is processed. Once the processing of the higher priority exception is complete, the processing of the lower priority exception resumes. To ensure that processing of the lower priority exception is resumed from the same point at which it was paused a mechanism is implemented to preserve the state of the main register set at the point the high priority exception occurs. In the system 600 of FIG. 6 a shadow register set 624 is used to process high priority exceptions so that they can be processed quickly and efficiently without disrupting the processing of any lower priority exception.

The exception-driven computing-based system 600 of FIG. 6 generally corresponds to the exception-driven computing-based system 300 of FIG. 3. In particular, the exception-driven computing-based system 600 of FIG. 6, like the exception-driven computing-based system of 300 of FIG. 3, comprises a processor 604 and memory 602 that is used to stored computer executable instructions that are executed by the processor 604. The processor 604 comprises a program counter 616; an execution unit 618; and a main register set 620, which generally correspond to the program counter 316; execution unit 318; and, main register set 320 of FIG. 3 respectively. The memory 602 comprises a main program 606—that comprises initialisation instructions 610, mode conversion instructions 612 and exception-driven instructions 614—and subroutines A and B 607 and 611, which generally correspond to the main program 306—that comprises initialisation instructions 310, mode conversion instructions 312, exception-driven instructions 314—and subroutines A and B 307 and 309 of FIG. 3 respectively.

However, the processor 604 of FIG. 6 further comprises a shadow register set 624; and the memory 602 of FIG. 6 comprises at least two sets of exception handling instructions 608 and 609—one set of exception handling instructions 608 for handling or processing low priority exceptions, and a different set of exception handing instructions 609 for handing or processing high priority exceptions.

The low priority exception handling instructions 608 are initially configured to cause the execution unit 618 to save the appropriate register set before processing the low priority exception, and restore the appropriate register set using the saved information after the low priority exception is processed. In contrast, the high priority exception handling instructions 609 are configured to access the appropriate register set directly (i.e. without a save and restore of the appropriate register set).

The exception detection logic 622 is configured, upon detecting an exception has occurred, to determine the priority of the exception and adjust or update the program counter 616 to point to either the low priority exception handing instructions 608 or the high priority exception handling instructions 609 as appropriate and to instruct the execution unit 618 to use the appropriate register set.

For example, if the exception detection logic 622 detects a high priority exception, the exception detection logic 622 may be configured to update the program counter 616 to point to the high priority exception handling instructions 609 and to instruct the execution unit 618 to use the shadow register set 624; and if the exception detection logic 622 detects a low priority exception, the exception detection logic 622 may be configured to update the program counter 616 to point to the low priority exception handling instructions 608 and to instruct the execution unit 618 to use the main register set 620. In this way high priority exceptions are processed by the high priority exception handling instructions 609 using the shadow register set 624 and the low priority exceptions are processed by the low priority exception handling instructions 608 using the main register set 620.

The mode conversion instructions 612 of FIG. 6 are configured in the same manner as the mode conversion instructions 312 of FIG. 3 such that when they are executed by the processor 604 (e.g. execution unit 618) they cause the processor 604 (e.g. execution unit 618) to, once initialisation is complete, update (i) the low priority exception handling instructions 608 in memory; or (ii) the exception detection logic 622, so that if a low priority exception is detected when the system 600 is operating in exception-driven mode an exception handler will be invoked that processes the low priority exception without causing the execution unit 618 to perform saves and restores of the appropriate register set (e.g. main register set 620).

The system of FIG. 6 allows both low and high priority exceptions to be handled in an efficient manner when the system 600 is operating in exception-driven mode while ensuring lower priority exceptions can be processed correctly even if interrupted or disrupted by a higher priority exception.

Although FIG. 6 describes a system 600 in which exceptions are divided into two priority groups or levels, it will be evident to a person of skill in the art that the methods and principles described herein may be equally applied to systems with more than two nested exception levels or priorities. For each additional level or priority the processor may be configured to save and restore the registers or use a set of shadow registers.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), physics processing units (PPUs), radio processing units (RPUs), digital signal processors (DSPs), general purpose processors (e.g. a general purpose GPU), microprocessors, any processing unit which is designed to accelerate tasks outside of a CPU, etc. A computer or computer system may comprise one or more processors. Those skilled in the art will realise that such processing capabilities are incorporated into many different devices and therefore the term 'computer' includes set top boxes, media players, digital radios, PCs, servers, mobile telephones, personal digital assistants and many other devices.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an exception-driven computing-based system configured to perform any of the methods described herein, or to manufacture a device comprising any of the exception-driven computing-based systems described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an exception-based computing-based system will now be described with respect to FIG. 7.

Figure 7:
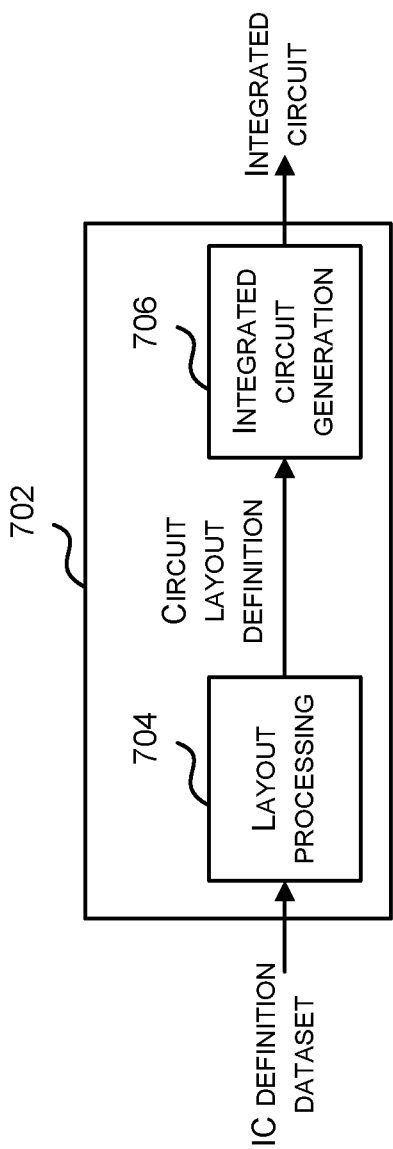
FIG. 7 is a block diagram of an example integrated circuit manufacturing system.

FIG. 7 shows an example of an integrated circuit (IC) manufacturing system 702 which comprises a layout processing system 704 and an integrated circuit generation system 706. The IC manufacturing system 702 is configured to receive an IC definition dataset (e.g. defining an exception-driven computing-based system as described in any of the examples herein), process the IC definition dataset, and generate an IC according to the IC definition dataset (e.g. which embodies an exception-driven computing-based system as described in any of the examples herein). The processing of the IC definition dataset configures the IC manufacturing system 702 to manufacture an integrated circuit embodying an exception-driven computing-based system as described in any of the examples herein.

The layout processing system 704 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 704 has determined the circuit layout it may output a circuit layout definition to the IC generation system 706. A circuit layout definition may be, for example, a circuit layout description.

The IC generation system 706 generates an IC according to the circuit layout definition, as is known in the art. For example, the IC generation system 706 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 706 may be in the form of computer-readable code which the IC generation system 706 can use to form a suitable mask for use in generating an IC.

The different processes performed by the IC manufacturing system 702 may be implemented all in one location, e.g. by one party. Alternatively, the IC manufacturing system 702 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an exception-driven computing-based system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 7 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 7, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

Aspects of the invention are disclosed in the following numbered clauses:

Clause 1. A method 400 of processing exceptions in an exception-driven computing-based system, the method comprising: executing, using a processor of the system, a main program which causes the system to operate first in an initialisation mode and then in an exception-driven mode 402, 412; detecting, using the processor, that an exception has occurred 404, 414; in response to detecting that an exception has occurred, executing, using the processor, one of one or more sets of exception handling instructions using a main register set 406, 416; and wherein when the system is operating in the initialisation mode the set of exception handling instructions that are executed invoke a first exception handler that causes the processor to save the main register set prior to processing the exception and restore the main register set after processing the exception 406, and when the system is operating in the exception-driven mode the set of exception handling instructions that are executed invoke a second exception handler that does not cause the processor to save and restore the main register set 416.

Clause 2. The method 400 of clause 1, wherein the exception handler that is invoked in response to detecting that an exception has occurred is dynamically adjusted when the system switches from operating in the initialisation mode to operating in the exception-driven mode 410.

Clause 3. The method 400 of clause 1 or clause 2, wherein the main program comprises mode conversion instructions, and executing the mode conversion instructions causes the system to switch from operating in the initialisation mode to operating in the exception-driven mode.

Clause 4. The method 400 of clause 3, wherein the one or more sets of exception handling instructions comprises a set of exception handling instructions stored in memory that is initially configured to invoke the first exception handler, and executing the mode conversion instructions causes the processor to update at least part of the set of exception handling instructions stored in memory so that the set of exception handling instructions stored in memory invoke the second exception handler.

Clause 5. The method 400 of clause 4, wherein executing the mode conversion instructions causes the processor to replace the set of exception handling instructions stored in memory with a different set of exception handling instructions so that the set of exception handling instructions stored in memory invoke the second exception handler.

Clause 6. The method 400 of clause 4, wherein executing the mode conversion instructions causes the processor to update the set of exception handling instructions stored in memory to include a jump to a different set of instructions that invoke the second exception handler.

Clause 7. The method 400 of clause 3, wherein: executing a particular set of exception handling instructions comprises exception detection logic of the processor updating a program counter of the processor to point to a predetermined address in memory where the particular set of exception handling instructions are stored; and the exception detection logic is initially configured to set the program counter to a first address of the memory in response to detecting an exception has occurred, and executing the mode conversion instructions causes the exception detection logic to reconfigured itself to set the program counter to a different address of the memory in response to detecting an exception has occurred.

Clause 8. The method 400 of any of clauses 1 to 7, further comprising: detecting, using the processor, a second higher priority exception has occurred; and in response to detecting that the second higher priority exception has occurred, executing, using the processor, a different set of exception handling instructions using a shadow register set, the different set of exception handling instructions invoking a third exception handler.

Clause 9. The method 400 of any of clauses 1 to 6, wherein executing a particular set of exception handling instructions comprises updating a program counter of the processor to point to a predetermined address in memory where the particular set of exception handling instructions are stored.

Clause 10. The method 400 of any of clauses 1 to 9, wherein when the system is operating in the initialisation mode, executing the main program causes the processor to access the main register set, and when the system is operating in the exception-driven mode executing the main program does not cause the processor to access the main register set.

Clause 11. An exception-driven computing-based system 300, 600 comprising: memory 302, 602 configured to store: a main program 306, 606; and one or more sets of exception handling instructions 308, 608; and a processor 304, 604 configured to: execute the main program 306, 606 which causes the system 300, 600 to operate first in an initialization mode and then in an exception-driven mode; detect that an exception has occurred; and in response to detecting that an exception has occurred execute one of the one or more sets of exception handing instructions 308, 608 using a main register set 320, 620 of the processor 304, 604; and wherein when the system 300, 600 is operating in the initialisation mode the set of exception handling instructions 308, 608 that are executed invoke a first exception handler that causes the processor 304, 604 to save the main register set 320, 630 prior to processing the detected exception and restore the main register set 320, 620 after processing the detected exception, and when the system 300, 600 is operating in the exception-driven mode the set of exception handling instructions 308, 608 that are executed invoke a second exception handler that does not cause the processor 304, 604 to save and restore the main register set 320, 620.

Clause 12. The system 300, 600 of clause 11, wherein the main program 306, 606 causes the processor 304, 604 to dynamically adjust the exception handler that is invoked in response to detecting an exception has occurred when the system 300, 600 switches from operating in the initialisation mode to operating in the exception-driven mode.

Clause 13. The system 300, 600 of clause 11 or clause 12, wherein the main program 306, 606 comprises mode conversion instructions 312, 612 which, when executed by the processor 304, 604, cause the system 300, 600 to switch from operating in the initialisation mode to operating in the exception-driven mode.

Clause 14. The system 300, 600 of clause 13, wherein the one or more sets of exception handing instructions comprises a set of exception handling instructions that is initially configured to invoke the first exception handler, and executing the mode conversion instructions 312, 612 causes the processor 304, 604 to update at least part of the set of exception handling instructions 308, 608 stored in memory 302, 602 so that the set of exception handling instructions 308, 608 invoke the second exception handler.

Clause 15. The system 300, 600 of clause 14, wherein executing the mode conversion instructions 312, 612 causes the processor 304, 604 to replace the set of exception handling instructions 308, 608 stored in the memory 302, 602 with a different set of exception handling instructions so that the set of exception handling instructions 308, 608 stored in the memory 302, 602 invoke the second exception handler.

Clause 16. The system 300, 600 of clause 14, wherein executing the mode conversion instructions 312, 612 causes the processor 304, 604 to update the set of exception handling instructions 308, 608 stored in the memory 302, 602 to include a jump to a different set of instructions that invoke the second exception handler.

Clause 17. The system 300, 600 of clause 13, wherein the processor 304, 604 comprises exception detection logic 322, 622 and executing a particular set of exception handling instructions 308, 608 comprises the exception detection logic 322, 622 updating a program counter 316, 616 of the processor 304, 604 to point to a predetermined address in memory 302, 602 where the particular set of exception handling instructions are stored; and the exception detection logic 322, 622 is initially configured to set the program counter 316, 616 to a first address of the memory 302, 602 in response to detecting an exception has occurred, and executing the mode conversion instructions 312, 612 causes the exception detection logic 322, 622 to reconfigured itself to set the program counter 316, 616 to a different address of the memory in response to detecting an exception has occurred.

Clause 18. The system 600 of any of clauses 11 to 17, wherein the memory is further configured to store a different set of exception handling instructions configured to invoke a third exception handler; and the processor 604 is further configured to: detect a second higher priority exception has occurred; and in response to detecting that the second higher priority exception has occurred, execute the different set of exception handling instructions 609 using a shadow register set 624.

Clause 19. The system 300, 600 of any of clauses 11 to 18, wherein when the system 300, 600 is operating in the initialisation mode executing the main program 306, 606 causes the processor 304, 604 to access the main register set 320, 620 and when the system 300, 600 is operating in the exception-driven mode executing the main program 306, 606 does not cause the processor 304, 604 to access the main register set 320, 620.

Clause. 20. The system 300, 600 of any of clauses 11 to 19 wherein the system 300, 600 is embodied in hardware on an integrated circuit.

Clause 21. The system 300, 600 of any of clauses 11 to 20, wherein the system 300, 600 is an embedded system.

Clause 22. The system 300, 600 of any of clauses 11 to 21, wherein the system 300, 600 is a radio processing unit.

Clause 23. A method of manufacturing, at an integrated circuit manufacturing system 702, the exception-driven computing-based system 300, 600 of any of clauses 11 to 22.

Clause 24. An integrated circuit definition dataset that, when processed in an integrated circuit manufacturing system 702, configures the integrated circuit manufacturing system 702 to manufacture the exception-driven computing-based system 300, 600 of any of clauses 11 to 22.

Clause 24. A computer readable storage medium having stored thereon a computer readable description of an integrated circuit that, when processed in an integrated circuit manufacturing system 702, causes the integrated circuit manufacturing system 702 to manufacture the exception-driven computing-based system 300, 600 of any of clauses 11 to 22.

Clause 25. An integrated circuit manufacturing system 702 comprising: a non-transitory computer readable storage medium having stored thereon a computer readable description of an integrated circuit that describes the exception-driven computing-based system 300, 600 of any of clauses 11 to 22; a layout processing system 704 configured to process the integrated circuit description so as to generate a circuit layout description of an integrated circuit embodying the exception-driven computing-based system 300, 600; and an integrated circuit generation system 706 configured to manufacture the exception-driven computing-based system 300, 600 according to the circuit layout description.

The invention claimed is:

1. A method of processing exceptions in an exception-driven computing-based system, the method comprising:
    executing, using a processor of the system, a main program which causes the system to operate first in an initialisation mode and then in an exception-driven mode;
    detecting, using the processor, that an exception has occurred;
    in response to detecting that an exception has occurred, executing, using the processor, one of one or more sets of exception handling instructions using a main register set; and
    wherein when the system is operating in the initialisation mode the set of exception handling instructions that are executed invoke a first exception handler that causes the processor to save the main register set prior to processing the exception and restore the main register set after processing the exception, and when the system is operating in the exception-driven mode the set of exception handling instructions that are executed invoke a second exception handler that does not cause the processor to save and restore the main register set.

2. The method of claim 1, wherein the main program comprises mode conversion instructions, and executing the mode conversion instructions causes the system to switch from operating in the initialisation mode to operating in the exception-driven mode.

3. The method of claim 2, wherein the one or more sets of exception handling instructions comprises a set of exception handling instructions stored in memory that is initially configured to invoke the first exception handler, and executing the mode conversion instructions causes the processor to update at least part of the set of exception handling instructions stored in memory so that the set of exception handling instructions stored in memory invoke the second exception handler.

4. The method of claim 3, wherein executing the mode conversion instructions causes the processor to replace the set of exception handling instructions stored in memory with a different set of exception handling instructions so that the set of exception handling instructions stored in memory invoke the second exception handler.

5. The method of claim 3, wherein executing the mode conversion instructions causes the processor to update the set of exception handling instructions stored in memory to include a jump to a different set of instructions that invoke the second exception handler.

6. The method of claim 2, wherein:
executing a particular set of exception handling instructions comprises exception detection logic of the processor updating a program counter of the processor to point to a predetermined address in memory where the particular set of exception handling instructions are stored; and the exception detection logic is initially configured to set the program counter to a first address of the memory in response to detecting an exception has occurred, and executing the mode conversion instructions causes the exception detection logic to reconfigured itself to set the program counter to a different address of the memory in response to detecting an exception has occurred.

7. An exception-driven computing-based system comprising:
memory configured to store:
a main program; and
one or more sets of exception handling instructions; and
a processor configured to:
execute the main program which causes the system to operate first in an initialization mode and then in an exception-driven mode;
detect that an exception has occurred; and
in response to detecting that an exception has occurred execute one of the one or more sets of exception handing instructions using a main register set of the processor; and
wherein when the system is operating in the initialisation mode the set of exception handling instructions that are executed invoke a first exception handler that causes the processor to save the main register set prior to processing the detected exception and restore the main register set after processing the detected exception, and when the system is operating in the exception-driven mode the set of exception handling instructions that are executed invoke a second exception handler that does not cause the processor to save and restore the main register set.

8. The system of claim 7, wherein the main program causes the processor to dynamically adjust the exception handler that is invoked in response to detecting an exception has occurred when the system switches from operating in the initialisation mode to operating in the exception-driven mode.

9. The system of claim 7, wherein the main program comprises mode conversion instructions which, when executed by the processor, cause the system to switch from operating in the initialisation mode to operating in the exception-driven mode.

10. The system of claim 9, wherein the one or more sets of exception handing instructions comprises a set of exception handling instructions that is initially configured to invoke the first exception handler, and executing the mode conversion instructions causes the processor to update at least part of the set of exception handling instructions so that the set of exception handling instructions invoke the second exception handler.

11. The system of claim 10, wherein executing the mode conversion instructions causes the processor to replace the set of exception handling instructions with a different set of exception handling instructions that invoke the second exception handler.

12. The system of claim 10, wherein executing the mode conversion instructions causes the processor to update the set of exception handling instructions to include a jump to a different set of instructions that invoke the second exception handler.

13. The system of claim 9, wherein the processor comprises exception detection logic and executing a particular set of exception handling instructions comprises the exception detection logic updating a program counter of the processor to point to a predetermined address in memory where the particular set of exception handling instructions are stored; and
the exception detection logic is initially configured to set the program counter to a first address of the memory in response to detecting an exception has occurred, and executing the mode conversion instructions causes the exception detection logic to reconfigured itself to set the program counter to a different address of the memory in response to detecting an exception has occurred.

14. The system of claim 7, wherein
the memory is further configured to store a different set of exception handling instructions configured to invoke a third exception handler; and
the processor is further configured to:
detect a second higher priority exception has occurred; and
in response to detecting that the second higher priority exception has occurred, execute the different set of exception handling instructions using a shadow register set.

15. The system of claim 7, wherein when the system is operating in the initialisation mode executing the main program causes the processor to access the main register set and when the system is operating in the exception-driven mode executing the main program does not cause the processor to access the main register set.

16. The system of claim 7, wherein the system is embodied in hardware on an integrated circuit.

17. The system of claim 7, wherein the system is an embedded system.

18. The system of claim 7, wherein the system is a radio processing unit.

19. A non-transitory computer readable storage medium having stored thereon a computer readable description of an integrated circuit that, when processed in an integrated circuit manufacturing system, causes the integrated circuit manufacturing system to manufacture the exception-driven computing-based system as set forth in claim 7.

20. An integrated circuit manufacturing system comprising:
a non-transitory computer readable storage medium having stored thereon a computer readable description of an integrated circuit that describes the exception-driven computing-based system as set forth in claim 7;

a layout processing system configured to process the integrated circuit description so as to generate a circuit layout description of an integrated circuit embodying the exception-driven computing-based system; and an integrated circuit generation system configured to manufacture the exception-driven computing-based system according to the circuit layout description.

\* \* \* \* \*